United States Patent

[11] 3,598,068

| [72] | Inventors | Carl O. Rosendahl<br>2426 33rd Ave, San Francisco, Calif. 94116;<br>Lynn L. Hursh, San Francisco, Calif. |
|---|---|---|
| [21] | Appl. No. | 825,700 |
| [22] | Filed | May 19, 1969 |
| [45] | Patented | Aug. 10, 1971 |
| [73] | Assignee | Clyde J. Smart<br>Reno, Nev.<br>by said Rosendahl |

[54] SOIL TREATING APPARATUS
2 Claims, 3 Drawing Figs.

[52] U.S. Cl.................................................... 111/7.1,
172/22, 175/207
[51] Int. Cl........................................................A01c 23/02,
A01b 45/02
[50] Field of Search............................................ 111/6,
7.1—7.4, 89, 92—99; 172/21—22, 25, 41;
175/207

[56] References Cited
UNITED STATES PATENTS

| 1,979,541 | 11/1934 | Gunn | 111/7.1 |
| 2,303,726 | 12/1942 | Dettloff et al | 111/99 X |
| 3,015,364 | 1/1962 | Fitzgerald | 172/22 |
| 3,071,200 | 1/1963 | Kuhl | 111/7.2 X |
| 3,289,418 | 12/1966 | Edgerton | 111/7.3 |

FOREIGN PATENTS

| 1,112,954 | 5/1968 | Great Britain |

OTHER REFERENCES
Farm Implement and Machiner Review, Great Britain Nov. 1, 1954, pp. 1177—78, copy in Gp. 337 at 111- 7.1.

*Primary Examiner*—Robert E. Gagwill
*Attorney*—Townsend and Townsend

ABSTRACT: Soil treating apparatus including a body defining a chamber, a plurality of rotatably mounted drills carried by the body and projecting downwardly therefrom, each of the drills having a central bore communicating with the body chamber, handle means fixed to the body and projecting upwardly therefrom, means for rotatably driving the drills, and means for supplying fluid to the body chamber for flow through the central bores of the drills.

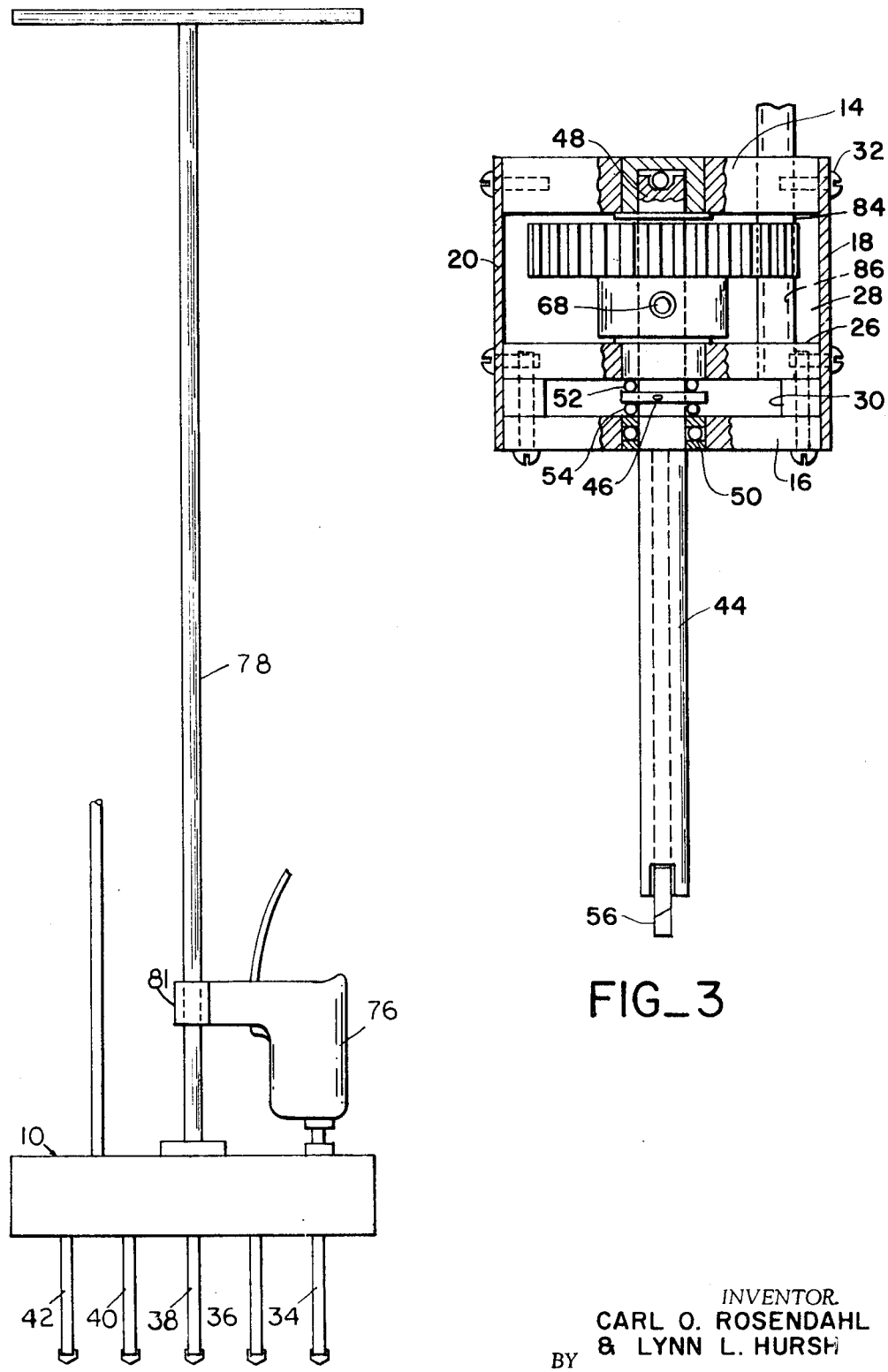

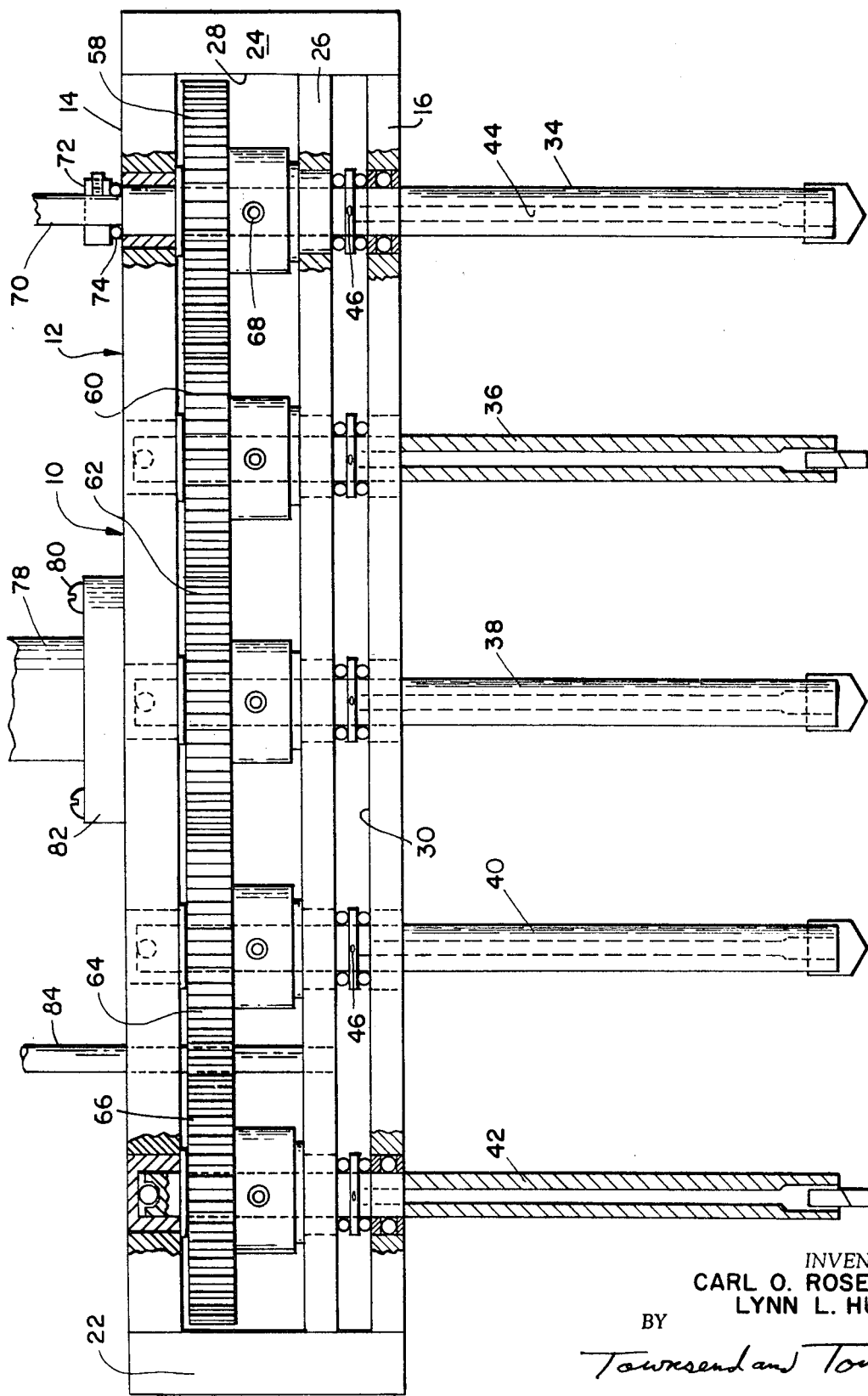
FIG_2

SOIL TREATING APPARATUS

BRIEF SUMMARY OF THE INVENTION

This invention relates to soil treating apparatus and, more particularly, to an improved soil treating apparatus adapted to perforate the soil for aeration purposes and also to apply fluid such as water or liquid fertilizer to the roots of grass, plants and the like.

Heretofore, various soil treating devices have been devised for the purpose of forming holes in compacted soil and also for the purpose of applying water and liquid fertilizer to the roots of grass, plants and the like. The last mentioned prior devices do not incorporate positive rotary drives and have been relatively cumbersome, expensive, difficult to transport, and are not entirely satisfactory for home use.

An object of the invention is to overcome disadvantages in prior devices of the indicated character and to provide soil treating apparatus particularly adapted for home use, which apparatus is relatively simple in construction and which may be readily carried about by a single person without the use of auxiliary equipment.

Another object of the invention is to provide improved soil treating apparatus which may be powered by conventional home power equipment such as portable electric drills, small electric motors, and the like.

Another object of the invention is to provide a portable lawn aerator having means for positively driving perforating tools or drills into the ground.

Another object of the invention is to provide improved soil treating apparatus that is economical to manufacture, durable, efficient and reliable in operation.

Still another object of the invention is to provide an improved lawn aerator capable of simultaneously perforating and applying water or liquid fertilizer to the soil.

The above as well as other objects and advantages of the present invention will become apparent from the following description, the appended claims and the accompanying drawings.

BRIEF DESCRIPTION OF THE DRAWINGS

FIG. 1 is an elevational view of soil treating apparatus embodying the present invention;

FIG. 2 is an enlarged front view of the apparatus illustrated in FIG. 1, showing the same with the front cover plate removed for the purposes of illustrating the interior of the apparatus; and FIG. 3 is an end view of the apparatus iLlustrated in FIG. 2, showing the same with the end cover plate removed so as to illustrate the interior of the apparatus.

DETAILED DESCRIPTION

Referring to the drawings, the present invention is shown embodied in soil treating apparatus, generally designated 10, which is adapted to perforate the soil for aeration purposes and is also adapted to apply water, liquid fertilizer or other liquid substances to the roots of grass, plants and the like simultaneously with the perforation operation. The soil treating apparatus 10 is comprised of a body portion, generally designated 12, which includes top and bottom members 14 and 16 joined by front and rear cover plates 18 and 20 and end cover plates 22 and 24. An intermediate plate member 26 is provided which extends between the front and rear plates 18 and 20 in spaced, substantially parallel relationship with respect to the top and bottom members 14 and 16 so that the body portion 12 of the apparatus is divided into two chambers 28 and 30, all of the plates being secured together in fluid tight relationship by conventional screws 32.

A plurality of rotatably mounted drills 34, 36, 38, 40 and 42 are provided which project downwardly from the body portion 12 of the apparatus, each of the drills having a central bore 44 communicating with the chamber 30 defined by the body portion 12, such communication being effected through transversely extending ports 46.

The upper end portion of each of the drills is mounted in a conventional ball thrust bearing 48 carried by the upper plate 14 while the intermediate portion of each of the drills passes through the intermediate member 26 and through a conventional bearing 50 carried by the lower plate 16 of the body portion 12 of the apparatus.

In order to seal the chamber 30 from the chamber 28 and the ambient atmosphere, conventional rotary seals 52 and 54 are provided on opposite sides of the ports 46 in each of the drills, the rotary seals 52 and 54 engaging the intermediate and lower plates 26 and 16, respectively, in fluid sealing relationship.

Each of the drills is also preferably provided with a carbide tip 56 so as to increase the life thereof while drilling through various soils, each of the carbide tips preferably being slightly wider in one plane and narrower in the other plane than the shanks of the drills to facilitate the flow of fluid through the central bores 44 of the drills.

Means for driving each of the drills 34, 36, 38, 40 and 42 is provided which is comprised of a plurality of gears 58, 60, 62, 64 and 66 disposed in meshing relationship within the chamber 28 and fixed to the respective drills through the agency of set screws 68. A drive shaft 70 is provided which is fixed to the gear 58 and which projects upwardly through the upper plate 14 at the right side of the body portion 12 as viewed in FIG. 2, the shaft 70 being retained by a collar 72 and sealed from the chamber 28 by a conventional rotary seal 74.

In order to drive the drills, a conventional portable electric hand drill 76 may be provided which can be connected to any suitable source of power.

An elongate handle 78 is provided the lower end portion of which is fixed to the upper plate 14, as by screws 80 which pass through a flange 82 integral with the handle. The handle serves to counteract the torque of the drill 76 during operation and the drill 76 may be secured to the handle 78 by a clamp 81.

In order that water, liquid fertilizer or other soil treating fluids may be applied to the soil simultaneously with the drilling operation, an inlet tube 84 is provided which passes through the upper plate 14 and the intermediate plate 26, the bore 86 of the inlet tube 84 communicating with the chamber 30 whereby fluid flowing through the inlet tube 84 may flow through the central bores 44 of the drills during the drilling operation which serves to perforate soil.

In operation the operator connects the inlet tube 84 to a suitable source of fluid under pressure such as a conventional water tap and any suitable or conventional means may be provided for combining fertilizer with the source of water. It is preferred that the fluid flowing into the chamber 30 be under relatively low pressure and any suitable pressure gland may be utilized to control the pressure of the fluid flowing into the chamber 30.

The operator then energizes the electric drill 76 and applies the carbide tipped end portions of the drills to the soil at the desired location, the weight of the apparatus serving to feed the drills into the ground as the drills rotate. The carbide tips 56 being slightly wider in one plane and narrower in the other plane than the shanks of the drills facilitates the flow of fluid through the central bores 44 of the drills and out to the soil being treated. As the drilling operation progresses, the fluid flowing through the inlet tube 84 passes into the chamber 30 from which the fluid then flows through the radial ports 46 and through the central bores 44 of each of the drills into the soil. The seals 52 and 54 serve to prevent the entrance of the fluid into the chamber 28 whereby the gears and bearings are protected from fluid.

From the foregoing it will be apparent that the soil treating apparatus may be utilized to aerate the soil without the application of fertilizer or other liquid simply by disconnecting the source of fluid from the inlet tube 84. If desired a suitable valve may be provided to control the flow of fluid through the inlet tube 84 so that the fluid may be applied periodically during the drilling operation.

While a preferred embodiment of the invention has been illustrated and described, it will be understood that various changes and modifications may be made without parting from the spirit of the invention.

What we claim is:

1. Soil treating apparatus comprising a body having an upper wall and a lower wall parallelly spaced from the upper wall, an impervious plate member mounted intermediate said upper wall and said lower wall, means enclosing the space between said plate member and said lower wall for defining a fluid tight chamber bounded by said enclosing means, said plate member and said lower wall, said lower wall defining a plurality of spaced apart openings therethrough, said plate defining a plurality of holes therethrough that correspond in number and location to the openings in said lower plate, a plurality of individual drills each of which is associated with one of said openings, each said drill having a cylindric shank portion extending through an associated opening in said lower wall and a corresponding hole in said plate so that said drills reside in mutually parallel spaced apart relation, means for rotatably sealing said shank portion at the openings in said lower wall and the holes in said plate, said drills each having an earth boring tip below said lower wall exterior said chamber and a central bore having a lower terminus at a port in said shank within said chamber to define a liquid path between said chamber and the tip of each said drill, means for conducting liquid to said chamber, a plurality of thrust bearings mounted to the lower surface of said upper plate, said thrust bearings corresponding in number and location to said openings in said plate, the shank portions of said drills extending to said thrust bearings and being rotatably supported thereby, a toothed gear mounted on each said shank portion intermediate said upper wall and said plate, said gears being intermeshed so that said drills rotate in unison, means for rotatably driving said drills, and an elongate handle extending upward from said body in a direction generally opposite said drills.

2. Apparatus according to claim 1 wherein said drills are supported in a linear array and wherein said handle is disposed centrally of said array, said drill driving means including a drive shaft rigid with a one of said drills that is spaced laterally of said handle, said drive shaft projecting above said upper wall, a portable electric drill having an output shaft coupled to said drive shaft, said portable electric drill having a hand grip remote from said output shaft, and means for clamping said hand grip to said handle.